(12) United States Patent
Kodo et al.

(10) Patent No.: US 6,555,083 B1
(45) Date of Patent: Apr. 29, 2003

(54) METHOD OF PREPARATION OF SEALED GAS CHAMBERS

(75) Inventors: Keiun Kodo; Yasumasa Kodo, both of Osaka-fu (JP)

(73) Assignee: Technostar Co., LTD, Osaka (JP)

(*) Notice: Subject to any disclaimer, the term of this patent is extended or adjusted under 35 U.S.C. 154(b) by 0 days.

(21) Appl. No.: 09/423,294

(22) PCT Filed: May 7, 1998

(86) PCT No.: PCT/JP98/02025

§ 371 (c)(1),
(2), (4) Date: Nov. 5, 1999

(87) PCT Pub. No.: WO98/50141

PCT Pub. Date: Nov. 12, 1998

(30) Foreign Application Priority Data

May 8, 1997 (JP) .............................. 9-118327

(51) Int. Cl.[7] .................... C01B 21/00; C01B 31/20; C01C 1/00
(52) U.S. Cl. .................. 423/351; 423/352; 423/437.1; 423/438; 423/659
(58) Field of Search ................................ 423/351, 352, 423/437.1, 659, 438

(56) References Cited

U.S. PATENT DOCUMENTS

| | | | |
|---|---|---|---|
| 2,558,756 A | * | 7/1951 | Jackson et al. ............. 423/579 |
| 3,370,915 A | * | 2/1968 | Sperberg .................... 423/351 |
| 3,607,066 A | * | 9/1971 | Basch et al. ................ 423/579 |
| 3,736,104 A | * | 5/1973 | Churchill et al. ........... 423/579 |
| 3,936,330 A | * | 2/1976 | Dergazarian et al. ....... 423/351 |
| 4,101,291 A | * | 7/1978 | Marion ....................... 423/579 |
| 4,508,700 A | * | 4/1985 | Hoshiko ..................... 423/579 |
| 4,600,123 A | | 7/1986 | Galbraith |
| 5,178,696 A | | 1/1993 | Ikeda et al. |
| 5,593,552 A | | 1/1997 | Joshi et al. |

FOREIGN PATENT DOCUMENTS

CA 2172822 10/1994

* cited by examiner

Primary Examiner—Wayne Langel
(74) Attorney, Agent, or Firm—Arent Fox Kintner Plotkin & Kahn PLLC

(57) ABSTRACT

A method of filling a sealed elastomer chamber (2, 6, 8) with gas is provided, wherein the chamber is filled with the gas chemically produced by thermal decomposition of a gas producing material (12, 14, 16) inside of the chamber itself using a usual means of a high frequency electromagnetic heating. This method is easier than a conventional gas filling method by charging a compressed gas from outside of the chamber to obtain a desired internal pressure in the chamber, and makes it possible to fill more than two sealed elastomer chambers individually with gas at one time.

6 Claims, 2 Drawing Sheets

METHOD OF PREPARATION OF SEALED GAS CHAMBERS

BACKGROUND OF THE INVENTION

1. Field of the Invention

The present invention relates to a method to prepare a sealed elastomer chamber filled with a kind of gas which can be chemically produced inside of the sealed chamber itself.

2. Description of Related Art

Conventional methods of preparing a sealed chamber filled with gas usually consist of several steps of (1) connecting a chamber to be filled with gas to an outlet of a gas bomb at an inlet of the chamber with a pipe, (2) charging gas from the bomb, (3) stopping gas charge when internal pressure of the chamber has reached to a prescribed value, and then (4) sealing the chamber.

The above described conventional methods require various instruments and devices such as a gas bomb, an outlet valve installed on the bomb, a gas pipe for connecting the bomb to the chamber and a pressure gauge, etc. Such conventional methods are usually complicated due to handling such various instruments and devices as described above.

In case more than two sealed chambers have to be filled with gas, such conventional methods require much complicated pipeline and more complex and tougher operation must be necessary for charging gas into each of individual chambers at different internal pressure at one time.

SUMMARY OF THE INVENTION

One of objects of the present invention is to provide a novel method for preparing sealed elastomer chambers filled with gas. In other words, formation of such a chamber is easier by filling a kind of gas to be produced by some chemical reaction, for instance by thermal decomposition of a gas producing material, inside of the sealed chamber itself.

Another object of the present invention is to provide a method to thermally decompose a gas producing material inside of the sealed elastomer chamber.

The other object of the present invention is to provide a method for preparing sealed elastomer chambers filled with a kind of gas at prescribed internal pressure by adjusting quantity of a gas producing material to be used.

According to the present invention, a sealed elastomer chamber can be filled with gas without charging compressed gas into the chamber from outside. Furthermore, more than two chambers can be independently filled with gas at one time and internal pressure can be controlled in each of individual chambers at different value by adjusting quantity of the gas producing material to be used. Sealing process can be absolutely avoided to complete the sealed gas chambers.

DETAILED DESCRIPTION OF PREFERRED EMBODIMENTS OF THE INVENTION

Figure 1:
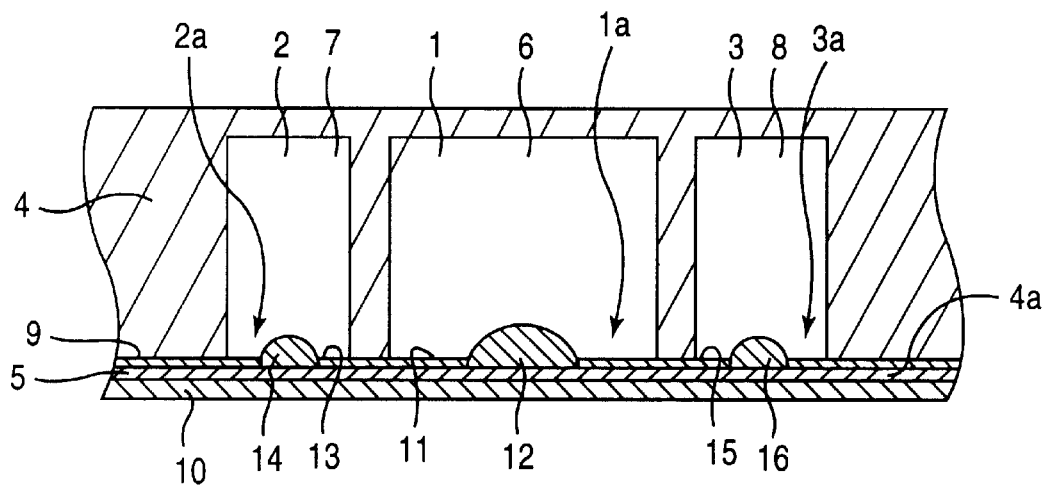
FIG. 1 is a schematic view to show one of the ideas of the present invention.

In order to achieve an object of the present invention, a gas producing composition (A), which consists of a gas producing material (1), a pyrogenic material (2) being capable to generate heat by eddy current and hysteresis loss induced in magnetic field, and a binder (3), is required. Pellets of a gas producing composition (A) may be prepared by mixing (1), (2) and (3) together. The composition (A) is to be placed in those chambers before sealing. It is exposed to magnetic field being formed by a high frequency oscillator to generate heat in the pyrogenic material (2), then generated heat can decompose the gas producing material (1) to produce gas inside. of the sealed elastomer chamber itself.

Gas producing materials (1), pyrogenic materials (2), binders (3) and materials of the sealed elastomer chamber used in the present invention shall be described in detail below.

Gas Producing Material (1)

A gas producing material (1) used in the present invention may be inorganic or organic blowing agents which are generally used as a blowing or foaming agent for various purposes. These agents are solid materials at a room temperature and are normally decomposed at a temperature of 50–220° C. and produce gas such as ammonia, nitrogen or carbon dioxide. Preferably, the agents are such compounds that can decompose at a relatively lower temperature and produce large volume of gas.

As an example of inorganic compounds of such blowing agents to be used in the present invention, a carbonate compound such as sodium bicarbonate and ammonium carbonate may be mentioned. These inorganic compounds can be used by itself or in combination with some acidic material such as ammonium chloride as a decomposition promoting agent.

Examples of the organic compounds of such blowing agents are shown in Table 1 as under.

Such gas producing materials with decomposition temperature of 50–220° C. are rather desirable. Some decomposition promoting agent may be added in order to decline decomposition temperature of the mixture. As such a decomposition promoting agent, for instant, a metal salt of an aliphatic acid such as calcium stearate, zinc stearate, zinc acetate and strontium naphthenate; a metal halide such as zinc chloride; a metal oxide; and urea compounds, etc. can be used. Dosage of such a decomposition promoting agent can be less than 30% by weight of the gas producing material, taking decomposition temperature of the gas producing material into account.

TABLE 1

| Blowing material | Example | Decomposition temperature | Gas volume produced |
|---|---|---|---|
| Azo compounds | Azo-dicarbon amide | 200–210° C. | 190–210 ml/g |
|  | Azo-bis-iso-butylonitril | 98–102° C. | 130–145 ml/g |
| Nitroso compound | N,N'-Dinitrosopenta-methylene tetramine | 200–205° C. | 232–252 ml/g |
| Sulfonyl hydrazide compounds | p-Toluene sulfonyl hydrazide | 155–160° C. | 108–124 ml/g |
|  | p,p'-Oxybis(bennzene-sulfonyl hydrazide) | ca. 155–160° C. | 106–116 ml/g |
| Dicarboxylic compound | Oxalic acid | 182–187° C. |  |

A gas producing material (1) and, in case required a decomposition promoting agent also, may be combined with a pyrogenic material (2) to be explained in detail below, and the combined material shall be mixed with a binder (3)

described under to make a gas producing composition (A). Then the composition (A) may be put in the elastomer chambers before sealing. Normally, a gas producing material and a pyrogenic material may preferably be used in a form of powder. The gas producing composition (A) can be used in a form of block or pellet. Although form of pyrogenetic materials (2) is to be described in detail later, in an embodiment of the present invention that a pyrogenic material (2) maybe used also in flakes woven fabric, non-woven fabric or a punched sheet, the mixture of a gas producing material (1) and a binder (3) may be placed or applied on a pyrogenic material (2). The expression of "a gas producing composition (A)" in the present invention should include the embodiment mentioned above.

Dosage of a gas producing material (1) may be determined depending upon volume of gas to be filled in a sealed elastomer chamber. If higher pressure of gas to be filled in the elastomer chamber is required, then the gas producing material (1) may be used in larger quantity. On the other hand, in case lower pressure sealed elastomer chamber is desirable, then less quantity of the gas producing material (1) may be applied. Dosage of the gas producing material (1) can be determined from gas volume produced from the gas producing material. (1), taking inner volume of the sealed elastomer chamber and pressure to be given to the chamber into account.

Pyrogenic Material (2)

A pyrogenic material (2) used in the present invention generates heat by eddy current and hysteresis loss when it is excited in magnetic field. As a pyrogenic material (2) of the present invention, magnetic materials, metals and carbon may be mentioned. A pyrogenic material (2) can be used by itself or in combination with two or more. Magnetic materials to be used in the present invention can be generally defined as a compound which has a property to be magnetized in magnetic field. Ferromagnetic materials maybe particularly preferred, but paramagnetic or diamagnetic materials also can be used. As the magnetic materials used in the present invention, various ferrite compounds or ferrous compounds such as iron-nickel, iron-manganese and iron-cobalt; manganese compounds; nickel compounds; titanium compounds; barium compounds; and palladium compounds, etc. may be mentioned. As the metal used in the present invention, iron, cobalt, nickel and stainless steels are mentioned as good examples. As the carbon to be used in the present invention, a common kind of carbon with high dielectric constant and high degree of crystallinity is preferable. For example, some commercially available conductive carbon and carbon,.fibers are generally good for the objective.

In addition to the above mentioned pyrogenic materials, commercially available conductive polysulfide rubber can be used as a pyrogenic material (2) of the present invention.

It is preferable to apply such a pyrogenic material (2) in a form which can efficiently induce eddy current, for example, powder, whisker, flake, fiber, woven fabric, non-woven fabric, mesh or a punched sheet, etc.

Dosage of pyrogenic materials (2) may be determined in such a range that the material (2) can supply to the gas producing material (1) with enough calorie to decompose the gas producing material (1) and to produce desired volume of gas. For determining such a range, decomposition temperature of the pyrogenic material (2) also should be taken into account.

Binder (3)

It is desirable that a binder (3) to be used in the present invention would create uniform contact between a pyrogenic material (2) and a gas producing material (1) and melt at the temperature reached by the pyrogenic material (2). As such a binder, a natural or synthetic resinous material, which is solid at a room temperature and melts at a temperature below 200° C. can be used. For example, a natural resin such as wax or rosin and a synthetic resin such as petroleum resins, coumarone resin, ethylene-vinyl acetate copolymer and polyolefin waxes can be mentioned. Quantity of a binder (3) to be used in the present invention may not be particularly limited, but can be determined in a range such that the binder can create uniform contact between a gas producing material and a pyrogenic material and be able to fix the mixture in elastomer chambers before sealing.

Elastomet Chamber

Material of an elastomer chamber of the present invention may not be particularly limited so far its elongation would be 200–2,000% and never leak the gas filled in the sealed elastomer chamber. It is preferable to use a thermoplastic elastomer of less gas-permeability. Such a thermoplastic elastomer can be voluntarily selected from commercially available materials for molding compounds depending on an objective of applications of the present invention. It includes thermoplastic elastomers of styrene, vinyl chloride, olefins, polyester, polyamide and polyurethane, etc.

Heat Generating Process

The process for generating heat toward a gas producing composition (A) being placed in a sealed elastomer chamber is so-called high frequency electromagnetic heating which includes dielectric heating and induction heating methods. Both of the heating methods can be applied in the present invention and arranged to meet with various elements such as shape of sealed elastomer chambers, decomposition temperature of a gas producing material and others. In case of induction heating method, the high frequency current induced by a high frequency oscillator runs through an induction coil and forms magnetic field, which excites a pyrogenic material (2) to induce eddy current and hysteresis loss as well. Then the pyrogenic material (2) generates enough heat to decompose a gas producing material (1) placed in a sealed elastomer chamber. In case of dielectric heating method, high frequency current induced by a high frequency oscillator runs through a couple of coils and forms magnetic field between the two electrodes, which excites mixture of a pyrogenic material (2) and a binder (3) to generate enough heat to decompose the gas producing material (1). In this case, self-heating of the binder (3) by dielectric loss and heating by eddy current and hysteresis loss of the excited pyrogenic material are both effective to decompose the gas producing material (1).

In practicing such methods of the present invention, frequency is in a range of 0.1–50 MHz for induction heating method, and 20.3 MHz or 40.6 MHz for dielectric heating method in compliance with a regulation in the Radio communication Law, respectively. Power output should be best for practicing those methods of the present invention in consideration of the application purpose and various conditions.

It is a dominant characteristic of the present invention that relatively short time is required for applying high frequency current induced by a high frequency oscillator through an induction coil or a couple of coils of a pair of electrodes. In other words, the time for heating a gas producing composition (A) by high frequency induction heating or dielectric heating, is as short as several or several tens of seconds, which can be adequately decided in consideration of decomposition temperature of the gas producing material (1).

Gas Filling Method

A Gas filling method of the present invention will be explained with reference to some drawings attached. These drawings are schematical views to show some embodiments of the present invention for clarifying its concept.

Embodiment of the first example of a gas filling method of the present invention is shown in FIG. 1.

As shown in FIG. 1, a large diameter sealed elastomer chamber 6 and small diameter sealed elastomer chambers 7 and 8 were composed of a polyurethane elastomer material 4 and a punched aluminum foil 5 to form a large diameter cylindrical concave part 1 and small diameter cylindrical concave parts 2 and 3. Each chamber, 6, 7 and 8, was filled with gas produced by a method described below. In this embodiment the punched aluminum foil 5 worked as a pyrogenic material. The punched aluminum foil 5 lined with a protective elastomer sheet 10 was adhered to the polyurethane elastomer material 4 with adhesive 9 applied on top surface 4a of the foil 5 to form sealed elastomer chambers.

As shown in FIG. 1, the large diameter cylindrical concave part 1 and the small diameter cylindrical concave parts 2 and 3 had openings 1a, 2a and 3a, respectively.

On the surface 11 of the punched aluminum foil 5 forming a part of an inner wall of the large diameter sealed elastomer chamber 6, homogeneous mixture 12 consisting of a gas producing material and a binder was placed in piled up hemispherical form.

Homogeneous mixture 14 consisting of a gas producing material (azobis-isobutyronitrile) and a binder (SBR adhesive in solid state at a room temperature) was placed on the surface 13 of the punched aluminum foil 5, which forms a part of an inner wall of the small diameter sealed elastomer chamber 7, in piled up hemispherical form. Separately, a homogeneous mixture 16 of a gas producing material and a binder was placed on the surface 15 of the punched aluminum foil 5, which forms a part of an inner wall of the small diameter sealed elastomer chamber 8, in piled up hemispherical form.

High frequency current induced by a high frequency oscillator (not shown in FIG. 1), which has power output of 5 kW, ran at frequency of 3 MHz through a spirally wound flat induction coil (also not shown in FIG. 1) to form magnetic field around the coil. A large diameter sealed elastomer chamber 6 and a couple of small diameter elastomer chambers 7 and 8 were placed in the magnetic field. In other words, a flat working plate provided with an induction coil was applied on a composite of these sealed elastomer chambers. High frequency current ran through the induction coil and induced eddy current in the aluminum foil 5. And then this aluminum foil generated heat. Time for applying such high frequency current was 20 seconds seemed to be adequate.

The heat generated in the aluminum foil decomposed the gas producing material in the mixtures 12, 14 and 16 and caused to produce nitrogen gas. Thus these sealed elastomer chambers were filled with nitrogen gas at desired internal pressures.

Quantity of the gas producing materials in the mixtures 12, 14 and 16 were prescribed taking volumes and desired internal pressures of the sealed elastomer chambers 6, 7 and 8 into account.

Figure 2:
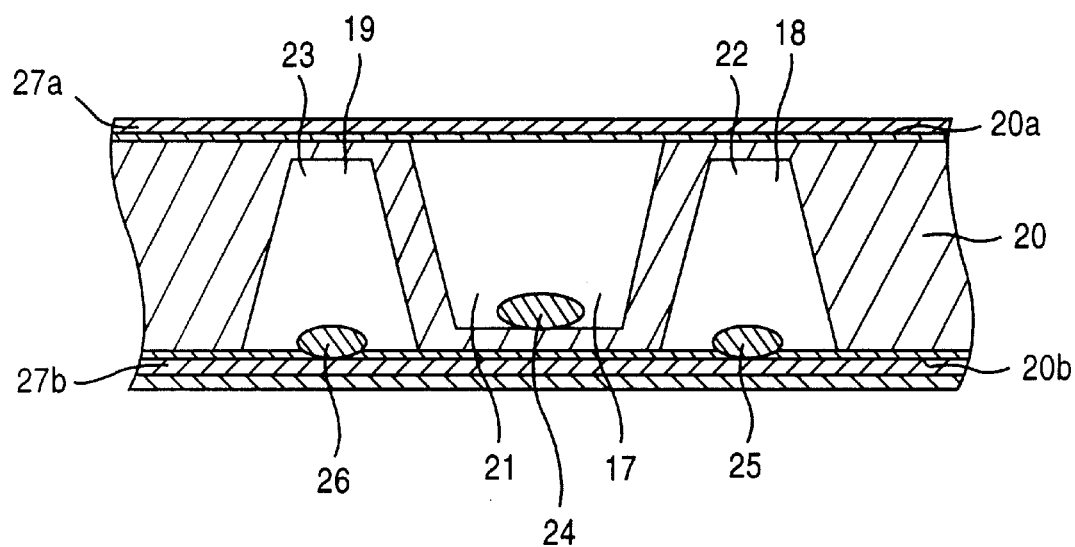
FIG. 2 is a schematic view to show another idea of the present invention.

Another embodiment of the present invention is shown in FIG. 2.

As shown in FIG. 2, a large diameter sealed elastomer chamber 21 and small diameter sealed elastomer chambers 22 and 23 were composed of a polyurethane elastomer material 20 to form a large diameter truncated conical section 17 and small diameter truncated conical sections 18 and 19 and elastomer sheets 27a and 27b. The polyurethane elastomer material 20 and elastomer sheets 27a and 27b were adhered with adhesives 20a and 20b to form sealed chambers. In each chamber 21, 22 and 23, desired numbers of gas producing composition tablets 24, 25 and 26 were placed respectively. These tablets consisted of a powdered gas producing material (sodium carbonate), a pyrogenic material (stainless steel fibers) and a binder (paraffin wax). Each chamber 21, 22 and 23 was filled with gas produced by the following method.

The composite described above was inserted between two electrodes (not shown in FIG. 2) connected to a high frequency oscillator (also not shown in FIG. 2) of 3 kW power output. High frequency current of 20.3 MHz induced by the high frequency oscillator allowed to run through the coils and formed magnetic field between the electrodes, where the tablets 24, 25 and 26 were placed. The tablets were excited in the magnetic field to generate heat due to dielectric loss and induced eddy current. Time for allowing high frequency current to run was about 30 seconds. Gas producing materials in these tablets were decomposed by heat and produced gas, with which the sealed elastomer chambers 21, 22 and 23 were filled at desired internal pressures.

Figure 3:
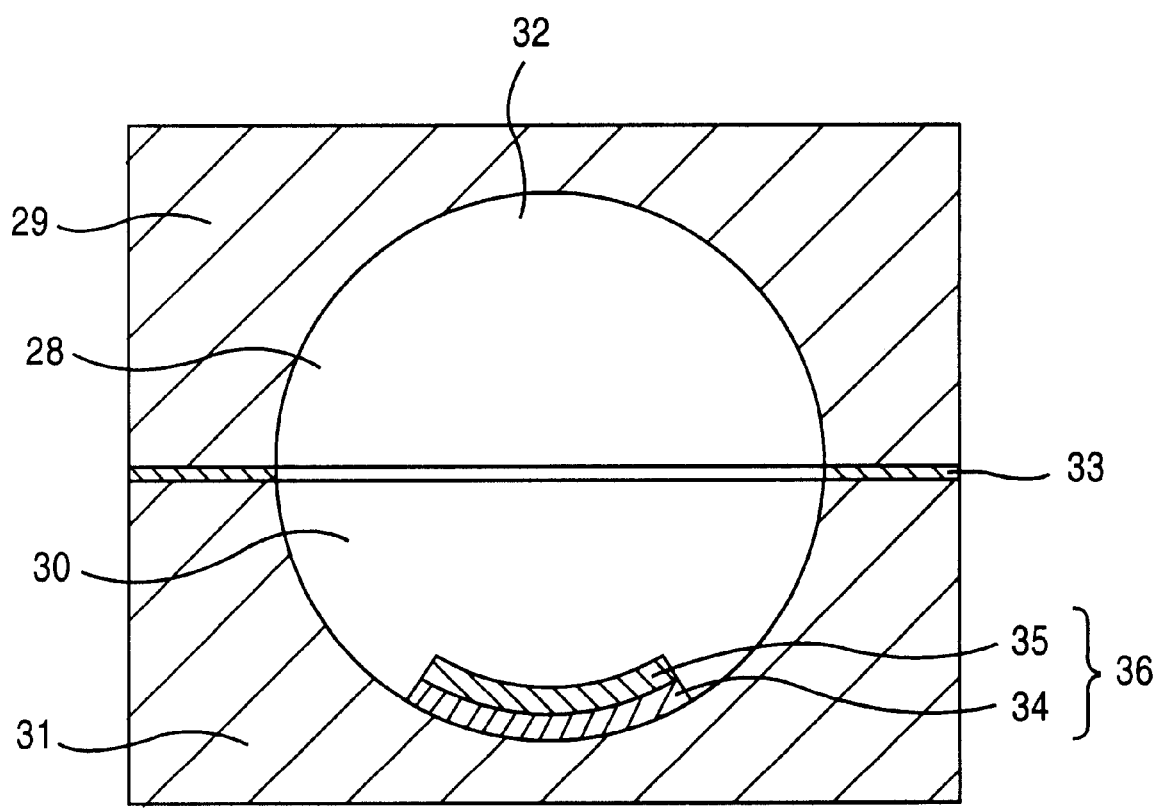
FIG. 3 is a schematic view to show the third idea of the present invention.

The third embodiment of the present invention was illustrated in FIG. 3.

As shown in FIG. 3, a spherical sealed elastomer section 32 was composed of a polyester part 29 having a hemispherical section 28 and another similar polyester part 31 having a hemispherical section 30. This spherical sealed elastomer chamber 32 was filled with gas to make the sealed elastomer chamber with desired internal pressure.

The above mentioned parts 29 and 31 with hemispherical sections 30 and 32 were fixed by adhesive 33 to form a spherical elastomer chamber 32. In this sealed elastomer chamber 32, a small piece of a gas producing composition 36, which comprises a mixture 35 of a gas producing material and a binder, was placed on a sheet of metal mesh 34. The mixture 35 was the same one as used in the first embodiment. The sealed elastomer chamber 32 was put in magnetic field by the same way as described in the first embodiment, and was filled with the produced gas at desired internal pressure.

Such gas filling method of the present invention is novel, because it is conducted by producing gas inside of a sealed elastomer chamber itself without charging compressed gas from outside. In addition, it is also characteristic that the chamber itself is never heated by any external heating for filling with gas in this method of the present invention. Therefore any material of such a chamber does not degrade through heating or thermal hysteresis by external heating. Such a method of the present invention can be conveniently applied to various materials. For example, the method of the present invention is practically applied to make sneakers with soles where sealed elastomer chambers filled with gas are installed as shock absorbers.

According to the method of the present invention,
1) Gas for filling a sealed elastomer chamber can be easily produced in the chamber itself by using simple means of high frequency electromagnetic heating without charging some compressed gas from outside;

2) Desired volume of gas to be produced in such a sealed elastomer chamber can be prescribed or adjusted by controlling dosage of a gas producing material. In other words, internal pressure of the sealed elastomer chamber to be filled with gas can be voluntarily controlled;
3) More than two sealed elastomer chambers can be individually filled with different kinds of gas at different internal pressure in each chamber at one time;
4) Because any external heating is not required at all, any material of the elastomer chamber does not degrade by heating or thermal hysteresis by external heating. Thermal efficiency is extremely superior because the time required for gas filling inside of the chamber at one time is very short; and
5) Designed volume of the sealed elastomer chamber, designed gas volume to be produced from a gas producing material and known decomposition temperature of a gas producing material allow to easily prescribe internal pressure of the chamber.

As mentioned above, any method for preparing a gas filled elastomer chamber without charging compressed gas from outside is absolutely unknown in the past. Therefore, such a method of the present invention should be appreciated as a novel valuable technical meaning.

What is claimed is:

1. A method for preparing sealed elastomer chambers filled with gas, which comprises the steps of a) placing (A) gas producing composition comprising (1) gas producing material, (2) pyrogenic material being capable of generating heat by eddy current and hysteresis loss induced in magnetic field and (3) binder in the sealed elastomer chambers, b) exposing the composition to magnetic field formed by a high frequency oscillator in order to generate heat in the pyrogenic material, and then c) decomposing the gas producing material to produce gas inside of the sealed chamber, thus filling the sealed chamber with gas.

2. The method according to claim 1, wherein the gas producing material is decomposed at temperature of 50–220° C. to produce ammonia, nitrogen or carbon dioxide gas.

3. The method according to claim 1, wherein the pyrogenic material is at least one selected from the group consisting of magnetic materials metals and carbon.

4. The method according to claim 1, wherein the pyrogenic material is in one form selected from the group consisting of powder, whisker, flake, fiber, woven fabric, non-woven fabric, mesh and a punched metal sheet.

5. The method according to claim 1, wherein the binder is a natural or synthetic resinous material which is solid at room temperature and melts at temperature below 200° C.

6. The method according to claim 1, wherein the gas producing composition contains a material which reduces the decomposition temperature of the gas producing material for promoting its decomposition.

* * * * *